United States Patent
Renfro et al.

(10) Patent No.: US 8,763,069 B2
(45) Date of Patent: *Jun. 24, 2014

(54) DYNAMIC ENTITLEMENT MANAGER

(75) Inventors: Chad Renfro, Waxahachie, TX (US); Christopher P. Higgins, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 821 days.

This patent is subject to a terminal disclaimer.

(21) Appl. No.: 12/147,824

(22) Filed: Jun. 27, 2008

(65) Prior Publication Data

US 2009/0328132 A1 Dec. 31, 2009

(51) Int. Cl.
*G06F 17/00* (2006.01)
*G06F 21/60* (2013.01)
*G06F 21/55* (2013.01)
*G06F 21/57* (2013.01)

(52) U.S. Cl.
CPC .............. *G06F 21/604* (2013.01); *G06F 21/55* (2013.01); *G06F 21/577* (2013.01)
USPC .......................................................... 726/1

(58) Field of Classification Search
CPC ..... G06F 21/55; G06F 21/552; G06F 21/577; G06F 21/604
USPC .......................................................... 726/1
See application file for complete search history.

(56) References Cited

U.S. PATENT DOCUMENTS

| 2004/0250120 A1 | 12/2004 | Ng |
| 2005/0138061 A1 | 6/2005 | Kuehr-McLaren et al. |
| 2005/0138419 A1 | 6/2005 | Gupta et al. |
| 2005/0138420 A1 | 6/2005 | Sampathkumar et al. |
| 2005/0216745 A1 | 9/2005 | Speare et al. |
| 2006/0089932 A1 | 4/2006 | Buehler et al. |

(Continued)

FOREIGN PATENT DOCUMENTS

| GB | 2461160 A1 | 12/2009 |
| WO | WO 2006/131906 A2 | 12/2006 |

OTHER PUBLICATIONS

Utility U.S. Appl. No. 12/509,241, filed Jul. 24, 2009.
Utility U.S. Appl. No. 12/509,244, filed Jul. 24, 2009.

(Continued)

*Primary Examiner* — Ashok Patel
*Assistant Examiner* — Kevin Bechtel
(74) *Attorney, Agent, or Firm* — Michael A. Springs; Moore & Van Allen PLLC; Nicholas C. Russell

(57) ABSTRACT

Embodiments of the invention relate to systems, methods, and computer program products for monitoring and/or controlling access to entitlements. For example, in one embodiment a computer program product is configured to periodically examine the members of a particular community in an organization and automatically identify members in the community that have access to software applications, datasets, or other organizational resources that are uncommon in the community, which may indicate that the member should not have access to the such resources. The computer program product of embodiments of the invention is also configured to automatically and periodically determine the resources that members of the same community should all probably have access to. As such, embodiments of the present invention allow an organization to more efficiently monitor and control access to its resources and other entitlements.

28 Claims, 11 Drawing Sheets

(56) References Cited

U.S. PATENT DOCUMENTS

| | | |
|---|---|---|
| 2007/0143859 A1 | 6/2007 | Ogi et al. |
| 2007/0244899 A1 | 10/2007 | Faitelson et al. |
| 2008/0168063 A1* | 7/2008 | Whitson .......................... 707/9 |
| 2008/0288330 A1* | 11/2008 | Hildebrand et al. ............ 705/10 |
| 2009/0125382 A1 | 5/2009 | Delepet |
| 2010/0131896 A1 | 5/2010 | Fitzmaurice et al. |

OTHER PUBLICATIONS

GB Search Report dated Oct. 29, 2010 for GB Application No. GB1012234.9.

GB Search Report dated Nov. 12, 2010 for GB Application No. GB 1012250.5.

UK Preliminary Examination and Search Report mailed Sep. 17, 2009 for GB Application No. GB0910444.9.

\* cited by examiner

| Run Analysis | ✓ |
|---|---|
| Hier Level (Community) | 4 |
| Community Membership Req (Uncommon Entitlement Threshold) | 2 |
| Friend (Normal Entitlement Threshold) | 5 |
| Inputfile | |
| ○ full_gjpbc_access.csv | |
| ● vm_access.csv | |
| Debug | ☐ |

Enter information

FIG. 9

| Community defined at | 3 dot level |
|---|---|
| Total Communities evaluated | 1 |
| Total unique platforms evaluated | 1230 |
| Total users evaluated | 111 |
| Total line of data evaluated | 4532 |
| Community | FNV |
| Number of high risk users | 20 |
| Number of high risk platforms | 332 |
| User Efficiency gain: | 81.98% |
| Platform Efficiency gain: | 73.01% |

| Community | Infection Rate | # Community Members |
|---|---|---|
| FNV | | 111 |

FIG. 10a

| Community defined at | 4 dot level |
|---|---|
| Total Communities evaluated | 6 |
| Total unique platforms evaluated | 1230 |
| Total users evaluated | 111 |
| Total line of data evaluated | 4532 |
| Community | FNVS |
| Community | FNVC |
| Community | FNVE |
| Community | FNVD |
| Community | FNVJ |
| Community | FNVA |
| Number of high risk users | 29 |
| Number of high risk platforms | 537 |
| User Efficiency gain: | 73.87% |
| Platform Efficiency gain: | 56.34% |

| Community | Infection Rate | # Community Members |
|---|---|---|
| FNVS | | 53 |
| FNVC | | 20 |
| FNVE | 36 % | 22 |
| FNVD | | 6 |
| FNVJ | | 4 |
| FNVA | 50 % | 6 |

FIG. 10b

| Name | Community | Platform |
|---|---|---|
| Individual | FNVS | DEDMZNIM010 |
| | | DEDMZWWWAS01 |
| | | DEDMZWWWAS02 |
| | | DEDMZWWWAS03 |
| | | DEDMZWWWAS04 |
| | | DWDMZNIM010 |
| | | DWDMZWWWAS01 |
| | | DWDMZWWWAS03 |
| | | HPRTXCSC01 |

FIG. 10c

DYNAMIC ENTITLEMENT MANAGER

FIELD

In general, embodiments of the invention relate to systems, methods, and computer program products for monitoring and/or controlling access to resources within an organization. More particularly, embodiments of the invention relate to automatically monitoring and/or controlling access to applications, datasets, and other entitlements in an organization by dynamically determining self-imposed entitlement equilibriums within each of a plurality of communities within the organization.

BACKGROUND

Within any organization, whether it be a large financial institution or other national or international business entity, a non-business entity, a governmental entity, or some other entity, it is important to monitor and control which members of the organization have access to which of the organization's information and resources as well as the types of access granted to each member. For example, in a banking institution certain people should have access to customer account information while others should not. Of these people with access to customer account information, some should have both read and write access while others should only have read access.

Other examples of access to resources within an organization that may need to be closely monitored include such things as access to customer and employee confidential information, access to different software applications and profiles, access to areas of a building or other physical or virtual structures, and the like. The different access rights granted to members of an organization are generally referred to herein as "entitlements."

Traditional techniques for monitoring and controlling the distribution of entitlements generally involve persons within the organization periodically reviewing the entitlements assigned to each individual member of the organization. Such traditional techniques pose significant problems. Perhaps the most significant problem is the fact that it takes a significant amount of an organization's resources to individually monitor and manage the entitlements of each member of the organization.

Specifically, large organizations can have tens or even hundreds of thousands of employees and millions of potential entitlements that need to be managed. Furthermore, each member is typically assigned numerous entitlements and, as such, there may be many millions of different entitlement combinations existing within the organization at any one time. Managing so many combinations of entitlements can be a monumental, if not impossible task, using traditional entitlement management techniques. The distribution of entitlements within an organization, however, is so important for both operation and compliance reasons that it must be monitored and controlled.

Additional confusion results when members transition to new roles within the organization. These transitioning members often require new entitlements to be able to operate effectively in their new roles, but they also may need their old entitlements for some period of time after their transition. If not properly managed, a person that transitions within the organization several times may accumulate a long line of legacy entitlements from previous roles in the organization. Such legacy entitlements may not be useful to the person any longer and can, in fact, create security risks or compliance issues if not properly monitored. For example, certain internal or external rules and regulations may require that one person not have access to entitlement "A" and entitlement "B." If a person who required access to entitlement A transitions within the organization several times and ends up in a role where he requires access to entitlement B but still has a access to entitlement A from his earlier role, the rules and regulations would be violated.

Confusion regarding the dissemination of entitlements may also arise any time a new system or technology is implemented since the entitlement administrators may not be aware of who needs access to the new system or technology and who can have the old system or technology entitlements removed. Other costs may also arise out of poor management of entitlements. For example, where the entitlements include access to software, improper monitoring and control of entitlements can result in greater licensing fees being paid to the software provider than is necessary. More specifically, the organization may pay a periodic fee to the software provider for each member of the organization that as access to the software. If members of the organization have access to the software but do not use or need the software any longer due to a change in job function or a change in systems, then the organization can save money in licensing fees if it can recognize the existence of such legacy access to the software.

A good entitlement management system should also be able to anticipate which entitlements a new employee or person transitioning into a new role will need to perform their job effectively. Traditional systems cannot anticipate needs effectively since the people managing the entitlements usually do not have intimate knowledge regarding the new employee's job function and which entitlements are needed for that job function. Even the new employee or the person transitioning into the new role will usually not know which entitlements they need because they may not know which entitlements are available. For all these reasons, organizations desire more efficient and accurate systems for managing the distribution of entitlements.

SUMMARY

Generally, embodiments of the invention relate to systems, methods, and computer program products for monitoring and/or controlling access to entitlements. For example, in one embodiment a computer program product is configured to periodically examine the members of a particular community in an organization and automatically identify members in the community that have access to software applications, datasets, or other organizational resources that are uncommon in the community, which may indicate that the member should not have access to the such resources. The computer program product of embodiments of the invention is also configured to automatically and periodically determine the resources that members of the same community should all probably have access to. As such, embodiments of the present invention allow an organization to more efficiently monitor and control access to its resources and other entitlements.

More particularly, embodiments of the present invention provide a computer program product for monitoring or controlling access to or distribution of a plurality of entitlements. The computer program product comprises a computer readable medium having computer readable program instructions stored therein. Said computer readable program instructions comprise first instructions configured to determine a community of entitlement-eligible entities in an organization, wherein each of a plurality of entitlement-eligible entities has one or more entitlements assigned thereto. Said computer readable program instructions further comprise second instructions configured to determine, based on a review of the entitlements assigned to the entitlement-eligible entities in the community, if any of the entitlements assigned to the entitlement-eligible entities in the community are uncommon within the community. In one embodiment, the entitlement-eligible entities within the same community have similar job functions.

In one embodiment, the computer program product further comprises third instructions configured to determine, based on a review of the entitlements assigned to the entitlement-eligible entities in the community, the entitlements that are normal to the community. In such an embodiment, the third instructions configured to determine the entitlements that are normal to the community may comprise instructions configured to determine normal entitlements based on a normal entitlement threshold where an entitlement is determined to be normal if the number of entitlement-eligible entities within the community that currently have said entitlement is greater than or equal to the normal entitlement threshold. The computer program product may further comprise instructions for receiving user input regarding the normal entitlement threshold.

In one embodiment, the second instructions that are configured to determine if any of the entitlements assigned to the entitlement-eligible entities in the community are uncommon within the community comprise instructions configured to determine uncommon entitlements based on a uncommon entitlement threshold where an entitlement is determined to be uncommon if the number of entitlement-eligible entities within the community that currently have said entitlement is less than the uncommon entitlement threshold. In this regard, the computer program product may further comprise instructions for receiving user input regarding the uncommon entitlement threshold.

In one embodiment, the computer program product further comprises instructions for identifying the entitlement-eligible entities within the community that have entitlements determined by the second instructions to be uncommon in the community.

In one embodiment, the entitlements comprise access to particular software applications, access to particular datasets, write access to particular datasets, access to certain organizational resources, or access to particular locations within a physical or virtual environment. In one embodiment, the entitlement-eligible entities comprises persons in the organization.

Embodiments of the present invention further provide a computer program product for monitoring or controlling access to or distribution of a plurality of entitlements. The computer program product comprises a computer readable medium having computer readable program instructions stored therein. Said computer readable program instructions comprise first instructions configured to determine a community of entitlement-eligible entities in an organization, wherein each of a plurality of entitlement-eligible entities has one or more entitlements assigned thereto. Said computer readable program instructions further comprise second instructions configured to determine, based on a review of the entitlements assigned to the entitlement-eligible entities in the community, the entitlements that are normal to the community.

Embodiments of the present invention further provide a system for managing entitlements. The system includes a memory device having stored therein information regarding a plurality of entitlement-eligible entities and information regarding one or more entitlements currently associated with each entitlement-eligible entity. The memory device further comprises community information stored therein regarding a plurality of communities and regarding which entitlement-eligible entities are in which communities. The system further includes a processing device communicatively coupled to the memory device. The processing device is configured to select a community of entitlement-eligible entities based at least partially on the community information stored in the memory device. The processing device is further configured to determine, based on a review of the one or more entitlements currently associated with each entitlement-eligible entity within the selected community, one or more uncommon entitlements whose number in the community is below a uncommon entitlement threshold or one or more normal entitlements whose number in the community is above a normal entitlement threshold.

Embodiments of the present invention further provide a method for managing the distribution of entitlements within an organization. For example, in one embodiment the method includes the steps of: (1) providing information regarding a plurality of members in the organization and the entitlements that are currently associated with each member; (2) grouping members from the plurality of members into one or more communities based on one or more similar job functions; (3) selecting a community from the one or more communities; (4) analyzing the entitlements that are currently associated with the members of the selected community to determine, for each entitlement in the selected community, the number of members in the selected community that are currently associated with each entitlement; (5) determining whether the number of members in the selected community that are currently associated with each entitlement is below a certain threshold; (6) identifying the members in the selected community associated with entitlements below the threshold; and (7) determining whether the identified members should be associated with the entitlements below the threshold.

In one embodiment, the method also includes: determining whether the number of members in the selected community that are currently associated with each entitlement is above a certain threshold; identifying the members in the selected community not associated with entitlements above the threshold; and determining whether the identified members should be associated with the entitlements above the threshold.

In one embodiment, the method further includes: determining an infection rate that provides an indication of the extent that the selected community is infected with entitlements below the threshold; comparing the infection rate of the selected community with an infection rate of at least one other community; and directing further resources to examining the entitlements of a community with a higher relative infection rate before directing further resources to examining the entitlements of a community with a lower relative infection rate.

BRIEF DESCRIPTION OF THE DRAWINGS

Figure 1:
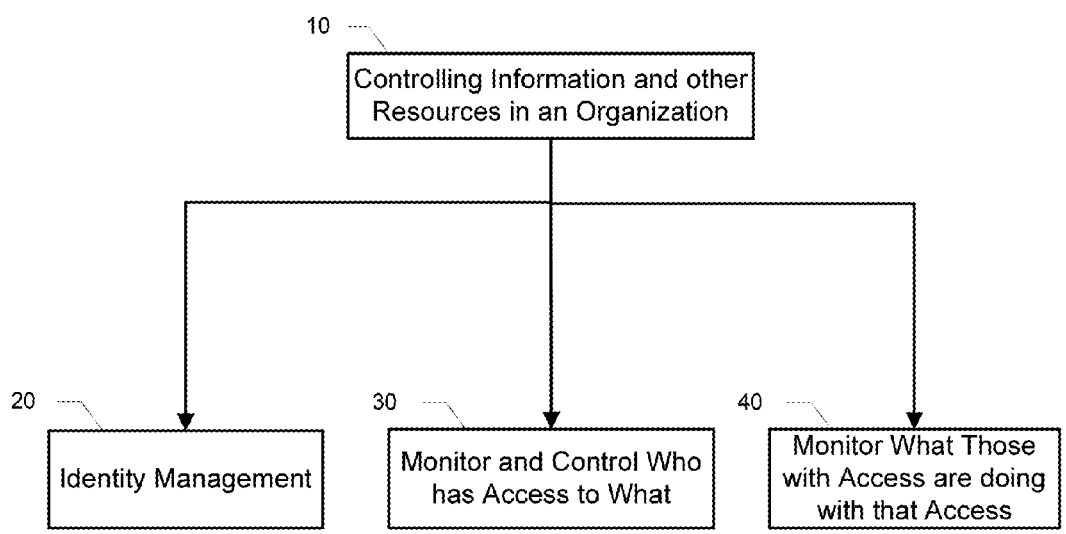
Figure 2:
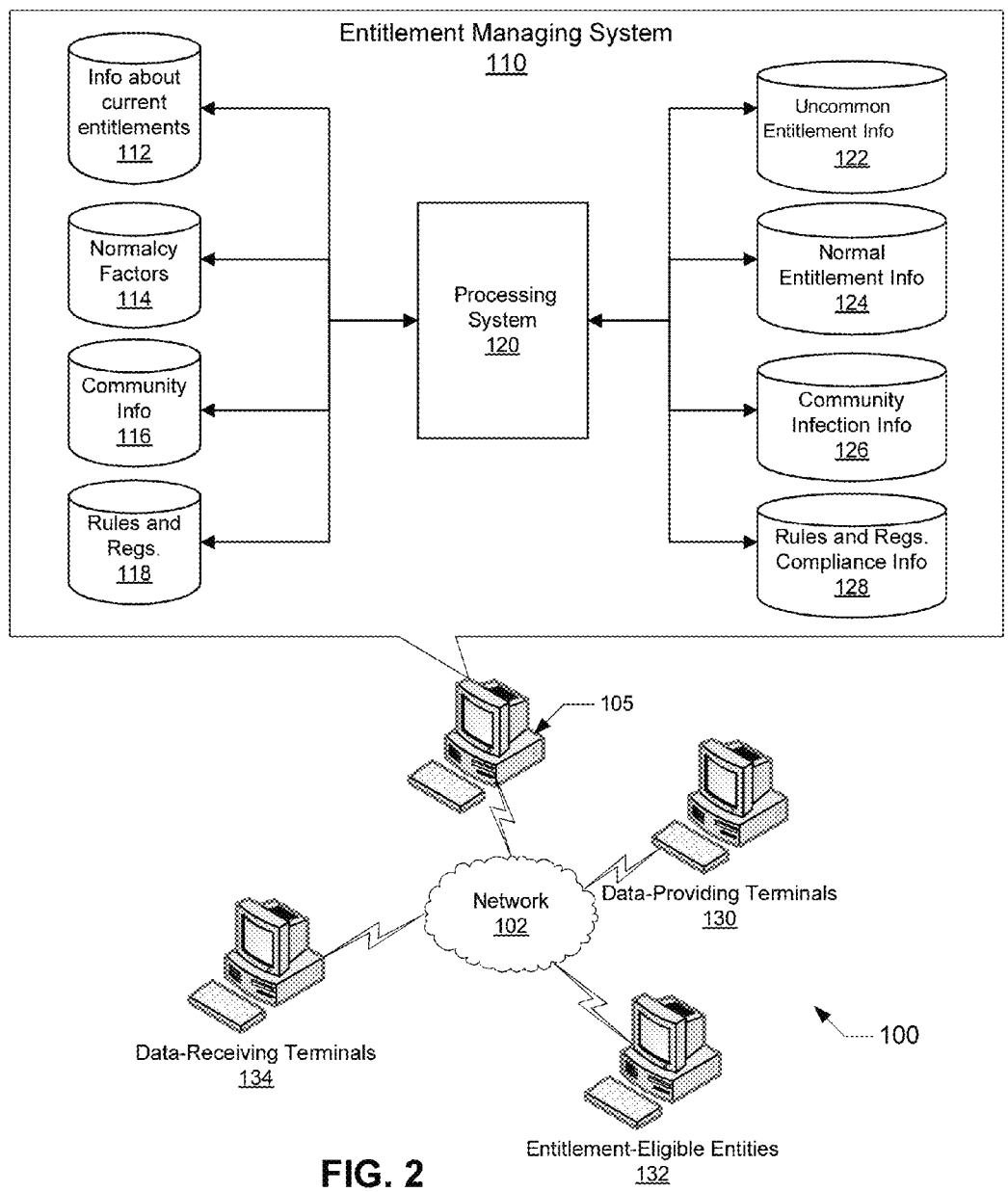
Figure 3:
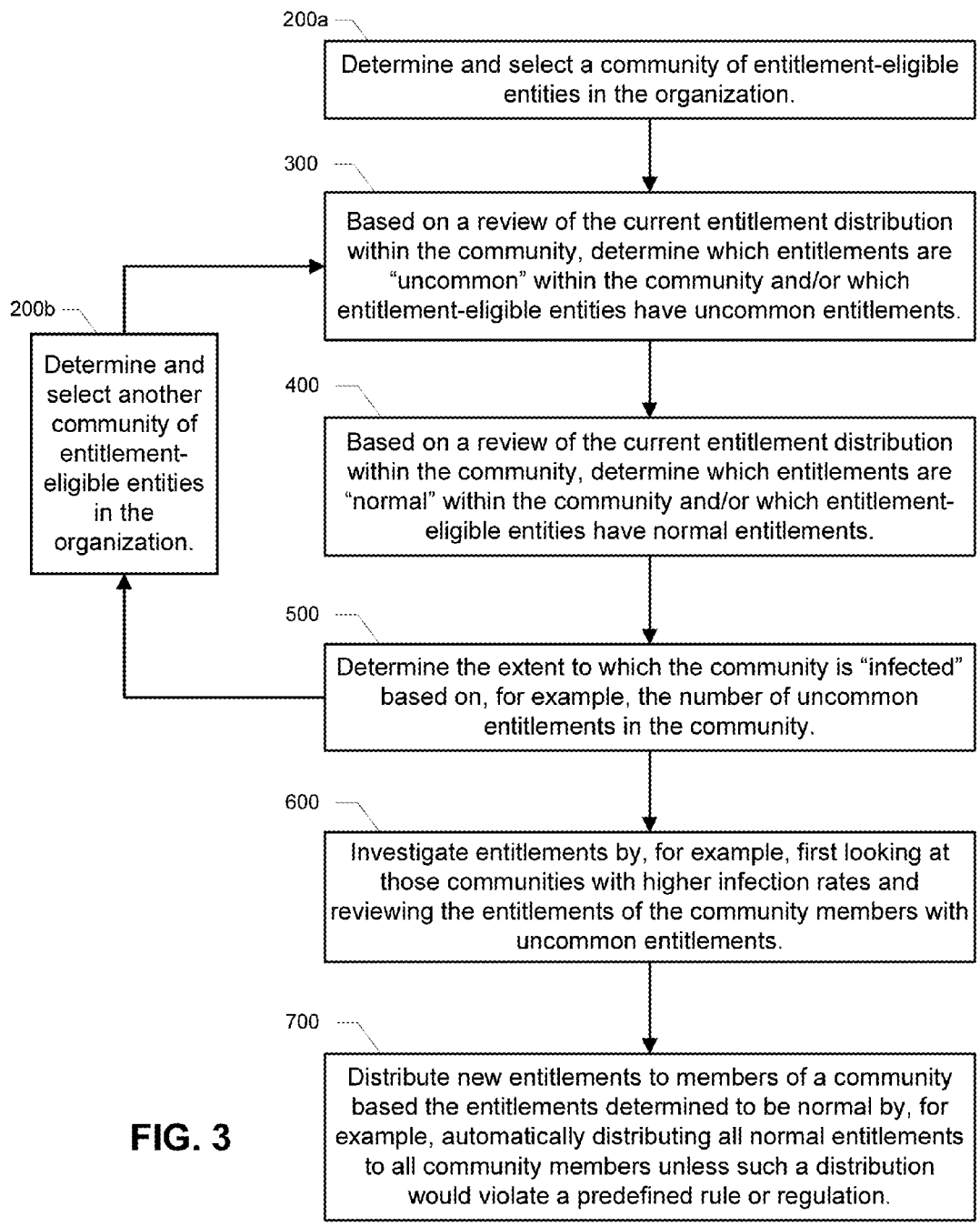
Figure 4:
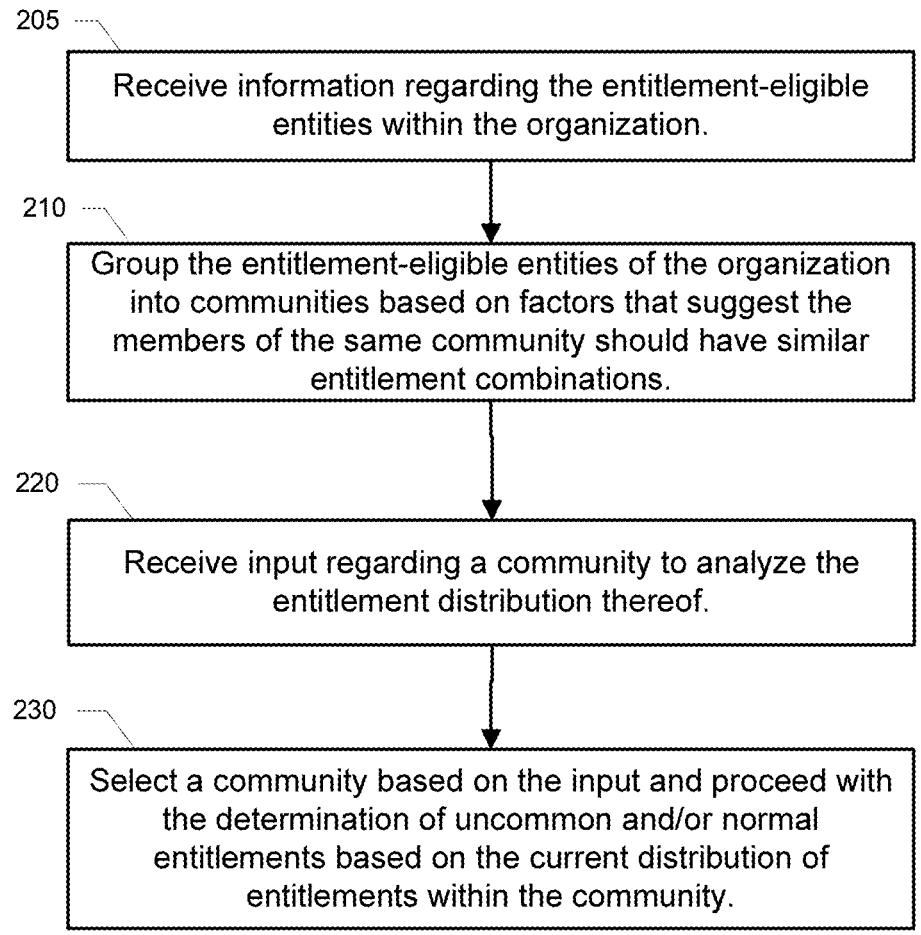
Figure 5:
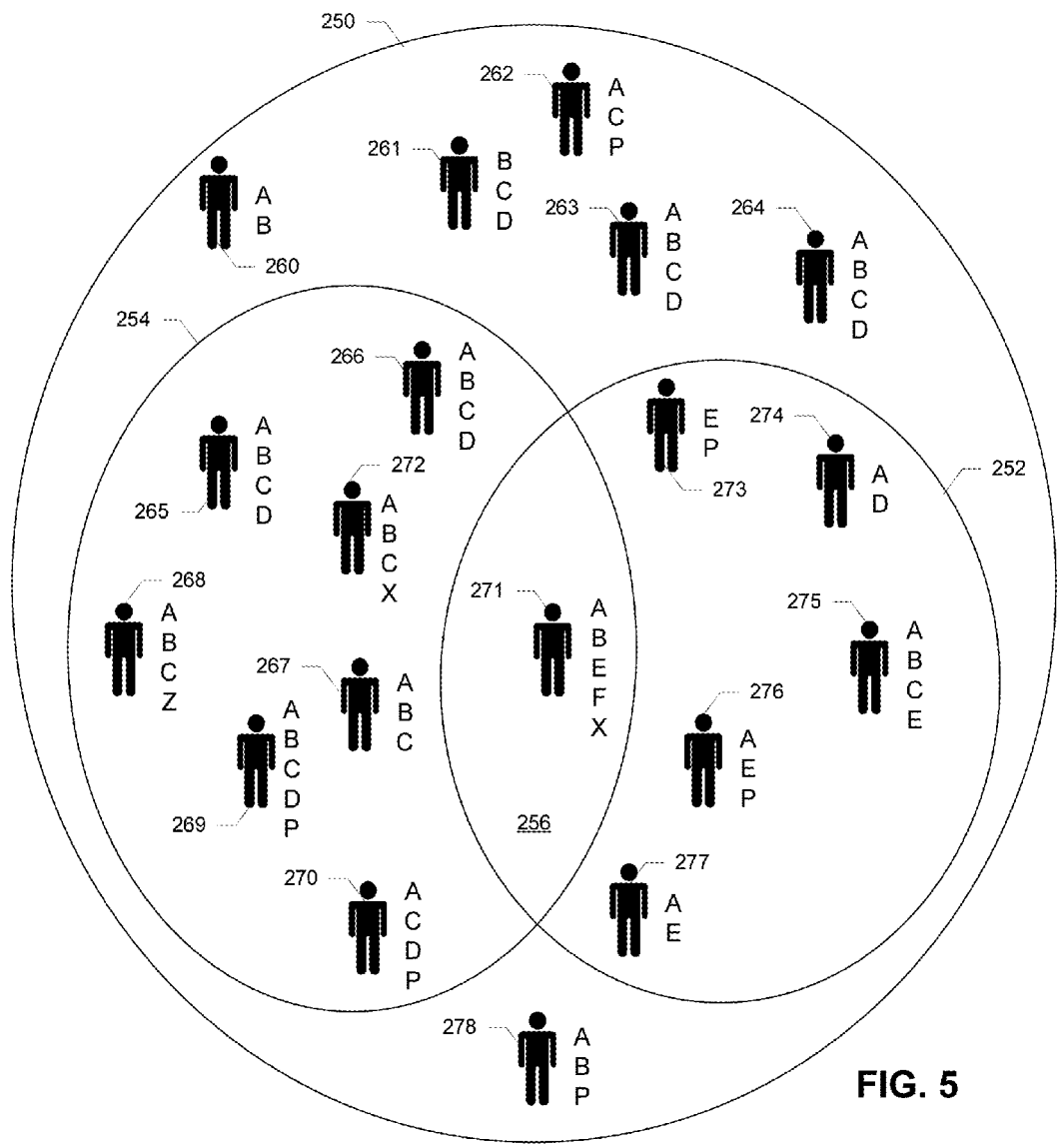
Figure 6:
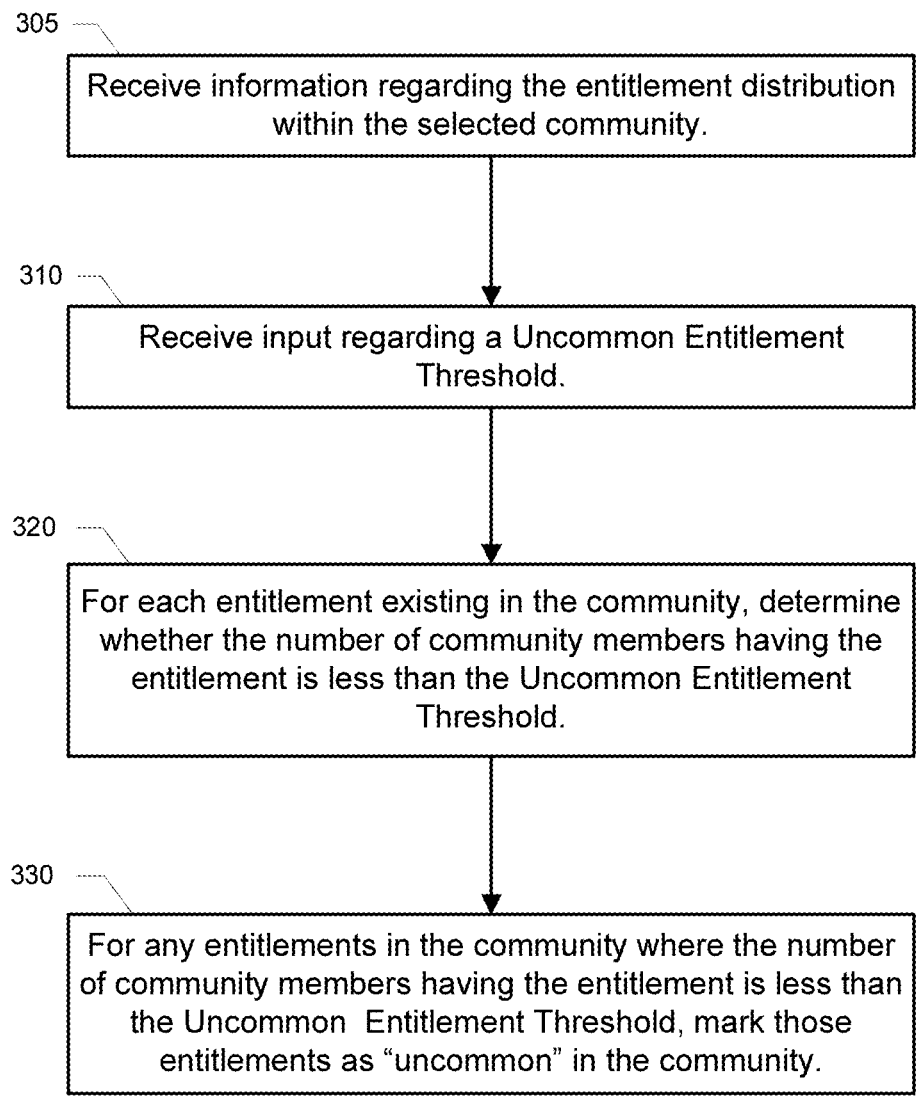
Figure 7:
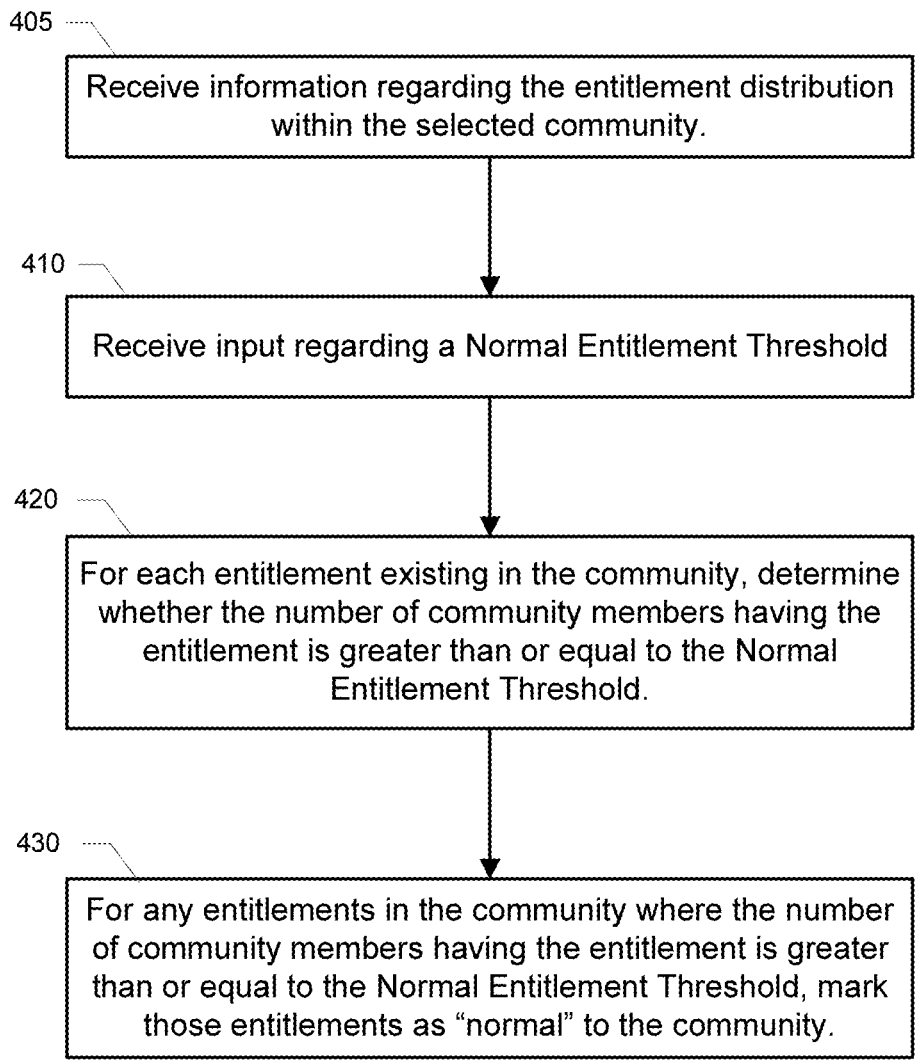
Figure 8:
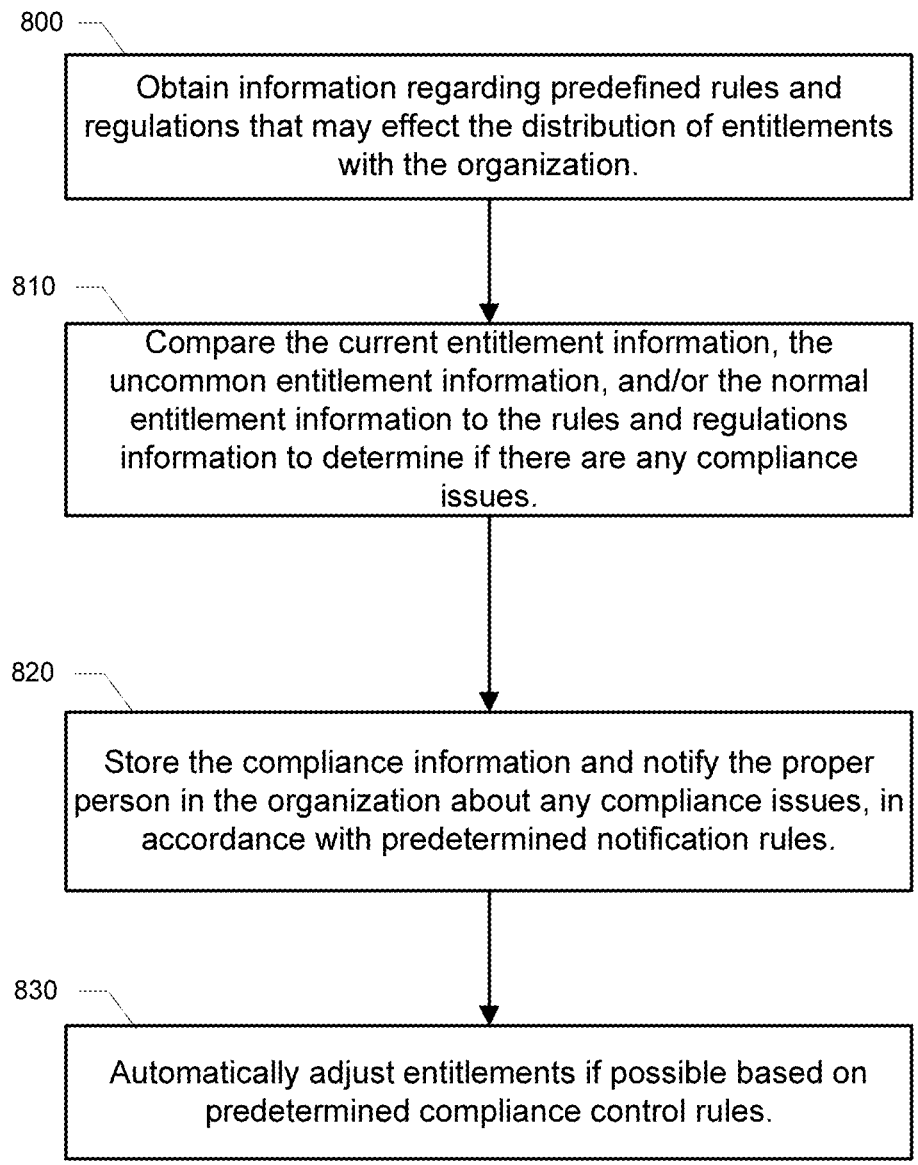

Having thus described embodiments of the invention in general terms, reference will now be made to the accompanying drawings, which are not necessarily drawn to scale, and wherein:

FIG. 1 is a block diagram illustrating a system for controlling the dissemination of information and other resources held and/or maintained by an organization, in accordance with an embodiment of the invention;

FIG. 2 is illustrates an entitlement managing system in accordance with an embodiment of the invention, as well as an environment in which the processes described herein are implemented in accordance with an embodiment of the invention;

FIG. 3 is a flow diagram illustrating a procedure for more efficiently monitoring and controlling the distribution of entitlements within an organization, in accordance with an embodiment of the invention;

FIG. 4 is a flow diagram illustrating a procedure for determining and selecting a community of entitlement-eligible entities in an organization, in accordance with an embodiment of the invention;

FIG. 5 is a simplified illustration of an organization of entitlement-eligible entities grouped into several overlapping communities and each having a combination of one or more entitlements, in accordance with an exemplary embodiment of the invention;

FIG. 6 is a flow diagram illustrating a procedure for determining "uncommon" entitlements currently existing within a community, in accordance with an embodiment of the invention;

FIG. 7 is a flow diagram illustrating a procedure for determining "normal" entitlements within a community, in accordance with an embodiment of the invention;

FIG. 8 is a flow diagram illustrating a procedure for automatically determining whether any entitlements or combinations of entitlements in an organization create any compliance issues for the organization, in accordance with an embodiment of the invention;

FIG. 9 illustrates an exemplary graphical user interface for allowing a user to input information into a computer program product in order to more efficiently analyze the entitlements within an organization, in accordance with an embodiment of the invention; and FIGS. 10a-c illustrate graphical user interfaces providing exemplary user output showing the results of the entitlement analysis performed in accordance with an embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method (including a business process), system, computer program product, or a combination of the foregoing. Accordingly, the present invention may take the form of an entirely hardware embodiment, an entirely software embodiment (including resident software, micro-code, etc.), or an embodiment combining software and hardware aspects (including firmware) that may generally be referred to herein as a "system." Furthermore, the present invention may take the form of a computer program product on a computer-readable medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) signals, or other mediums.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As described above, it is important for an organization to efficiently and accurately monitor and control access to information and resources held and/or maintained by the organization. As illustrated in FIG. 1, in one embodiment of the invention, a system 10 for controlling information and resources held and/or maintained by an organization includes three different sub-systems: an identity management system 20; a system 30 for managing who has access to what information and resources; and a system 40 for monitoring specifically what those with access are doing with that access. These three sub-systems, 20, 30, and 40, monitor and control access to the organization's information and resources from three different angles.

The identity management system 20 is involved with such measures as conducting background checks and/or verifying the identity of those that have or may receive access to the organization's resources. The system 30 is involved with monitoring who currently has access to which of the organization's resources and controlling the granting and withholding of access to the resources. The system 40 is directed to actually monitoring how those with access rights are actually using their access rights by, for example, asking such questions as: are they using the access, how are they using the access, what information or resources are they using and/or modifying, etc. Embodiments of the present invention are primarily directed to systems, methods, and computer program products for performing the role of the second sub-system, i.e., the system 30 for monitoring and controlling who has access to what information and resources.

In this regard, embodiments of the present invention are generally directed to systems, methods, and computer program products for monitoring and/or controlling the distribution of "entitlements," where the term "entitlement" generally refers to a distributed resource or the right to access a certain resource in a particular way. For example, in some embodiments entitlements include the right to access one or more datasets. For example, in one embodiment a particular entitlement may grant the entitlement-holder access to customer information. Other entitlements may grant the entitlement-holder access to other information, such as, for example, access to employee information, access to various levels of confidential or secret information, access to information of various levels of importance, access to financial accounts, access to accounting records, access to pay scales, access to system information, etc. Furthermore, where an entitlement provides access to one or more datasets, the entitlement may grant only read access, only write access, or both read and write access.

In some embodiments, entitlements include access to one or more areas of a physical or virtual environment, such as access to a physical room or building or access to a virtual data room. In some embodiments, entitlements include computer software or access to computer software. For example, in one embodiment an entitlement may provide a person in the organization with access to particular software available on the organization's network. However, it should be appreciated that, in some embodiments, multiple different entitlements can provide access to the same software where, for example, one entitlement grants the entitlement holder greater or lesser capabilities when using the software than another entitlement. It should also be appreciated that, unless specifically stated in the claims, the term entitlement is not intended to be limited to the examples described herein and may comprise other resources or access rights to such resources.

As used herein, the term "organization" generally refers to any business or non-business entity or enterprise comprised of a plurality of discrete units that require access to information and/or resources held and/or maintained by the organization. These discrete units are generally referred to herein as "entitlement-eligible entities" or "members" of the organization. As used herein, the terms "entitlement-eligible entity" and "member" are generally interchangeable.

In one embodiment, the entitlement-eligible entities or members of an organization include persons, which are typically employees of the organization but may also be clients, customers, other organizations, and the like. In some embodiments, the entitlement-eligible entities include computing devices. For example, where entitlements provide software or access to software, then, in one embodiment, the entitlement-eligible entity may be a computer or workstation that will be provided with the software or access to the software instead of a particular person. However, in other embodiments where entitlements provide software or access to software, the software or access thereto may be distributed to specific persons in the organization (or such persons' unique computer profiles) rather than to specific computers or work stations.

Referring again to the figures, FIG. 2 illustrates an entitlement managing system 110 in accordance with an embodiment of the invention. FIG. 2 also illustrates an environment 100 in which the processes described herein may be implemented in accordance with an embodiment of the invention. As illustrated in FIG. 2, one embodiment of the invention comprises a network 102 interconnecting a plurality of computing devices and/or terminals. One or more computing devices 105 operate an entitlement managing system 110. The entitlement managing system 110 is configured to periodically analyze the current distribution of entitlements within an organization in order to automatically identify any "red flag" issues that may require further analysis. In this way, the organization's resources for monitoring entitlements can be more efficiently used by directing the resources to these flagged issues. In some embodiments, the entitlement managing system 110 is also configured to automatically distribute or withdraw entitlements within the organization to address these flagged issues or other issues.

FIG. 3 is a flow diagram illustrating a procedure for more efficiently monitoring and controlling the distribution of entitlements within an organization, in accordance with an embodiment of the invention. In one embodiment, the procedure described in FIG. 3 is implemented by the entitlement managing system 110 of FIG. 2. As illustrated by block 200a, the entitlement-eligible entities within the organization are divided into a plurality of communities and at least one of the plurality of communities is initially selected for analysis.

FIG. 4 is a flow diagram illustrating a procedure for dividing the entitlement-eligible entities into communities and selecting a community in accordance with an embodiment of the invention. As illustrated by block 205 in FIG. 4, information is received regarding all of the entitlement-eligible entities within an organization. Such information may be received from one or more a data-providing terminals 130 or directly from one or more entitlement-eligible entities 132 where the entitlement-eligible entities are computers or are represented by computers or computer profiles.

As illustrated by block 210, the entitlement-eligible entities of the organization are then grouped into "communities" based on factors that suggest the members of the same community should have similar entitlement combinations. For example, in one embodiment the communities are determined based on hierarchy within the organization. In this regard, the community groupings may be based on such factors as job function, department or division, rank, level, authority, security clearance, and/or the like.

In some embodiments of the invention, communities are permitted to overlap. As such, in some embodiments a single entitlement-eligible entity may belong to a plurality of communities. For example, FIG. 5 is a simplified illustration of an exemplary organization 250 comprised of a plurality of members/entitlement-eligible entities 260-278. In the illustrated embodiment the entire organization 250 as a whole makes up one community that is then further divided into smaller communities 252 and 254 based on both job function and level of authority. For example, suppose that member 271 is a vice-president in the internal auditing department of the organization. As illustrated in FIG. 5, member 265 may be a member of three different communities: one being the organization 250 as a whole, one being vice presidents within the organization 252, and one being the internal auditing department 254. These communities may exist in this way since each of these communities are likely to involve different entitlements from community to community but are also likely to share many entitlements with others within each community.

In some embodiments where communities overlap, a user of the entitlement managing system 110 may be able to create additional communities that are combinations of two or more communities. For example, referring to FIG. 5, a user of the system 110 may be able to analyze a community of entitlement-eligible entities that are members of both the auditing department community 254 and vice president community 252, i.e., a community 256 of vice presidents in the auditing department. In the illustration of FIG. 5, member 271 is the only member of this community 256 of vice presidents in the auditing department.

As illustrated in FIG. 2, the community information 116, including information about the entitlement-eligible entities within the organization and the community or communities to which each entitlement-eligible entity belongs, may be stored in the memory of the computing device 105. In one embodiment, the processing system 120 automatically determines the community information 116 based on data received from one or more data-providing terminals 130. In other embodiments, the community information 116 is determined by another system and provided to the computing device 105 by one or more data-providing terminals 130 via the network 102. In still other embodiments, the processing system 120 attempts to generate communities based on a statistical analysis of the distribution of entitlements within the community, lumping those together that have a certain level of similarity in their combinations of entitlements.

As illustrated by blocks 220 and 230 of FIG. 4, once the community information 116 has been established, the processing system 120 selects a particular community to analyze. As described in FIG. 4, in one embodiment the selection of a community is based on user input received, for example, from a user input device of the computing device 105. Once a community has been selected for analysis, the processing system 120 proceeds to step 300 illustrated in FIG. 3.

As illustrated by block 300 in FIG. 3, the processing system 120 determines, based on a review of the current entitlement distribution within the community, which entitlements within the community are considered "uncommon" within the community and should be flagged. A uncommon entitlement is generally an entitlement that is determined by the entitlement managing system 110 to be uncommon within the selected community and that, therefore, may be unneeded or undesirable within the community or at least should be flagged as requiring specific validation. FIG. 6 provides a flow diagram illustrating a procedure for determining "uncommon" entitlements currently existing within a community in accordance with an embodiment of the invention.

As illustrated by block 305 in FIG. 6, the processing system 120 receives or accesses information regarding the current entitlement distribution within the selected community. For example, in one embodiment, the current entitlement information 112 is stored in the memory of the computing device 105. In other embodiments, however, the processing system may access this information over the network 102 from one or more other computing systems, such as one or more data-providing terminals 130. The current entitlement information 112 generally contains a listing of the entitlements assigned to each entitlement-eligible entity within the selected community.

As illustrated by block 310 in FIG. 6, the processing system 120 also receives input regarding a uncommon entitlement threshold. The uncommon entitlement threshold may be provided by a user and stored in the normalcy factor datastore 114 in the memory of the computing device 105. In one embodiment, the uncommon entitlement threshold is community specific. In other embodiments, however, the same uncommon entitlement threshold is used when analyzing all of the different communities in an organization. In one embodiment, the uncommon entitlement threshold entered by the user is an integer representing the minimum number of entitlement-eligible entities within the selected community that must have a particular entitlement in order for the particular entitlement to not be considered uncommon. In other embodiments, the uncommon entitlement threshold entered by the user is a percentage representing the minimum percentage of entitlement-eligible entities within the selected community that must have a particular entitlement in order for the particular entitlement to not be considered uncommon.

In still other embodiments, the uncommon entitlement threshold is automatically computed by the processing system 120 based on a statistical analysis of the distribution of entitlements within the community and/or other communities. For example, the uncommon entitlement threshold may be computed as being the number of entitlement-eligible entities having an entitlement in common that is some "x" number of standard deviations below the mean number of entitlement-eligible entities having an entitlement in common for the community or the organization.

As illustrated by block 320 in FIG. 6, the processing system 120 analyzes each entitlement within the community to determine whether the number of community members having the entitlement is less than the uncommon entitlement threshold. As illustrated by block 330, any entitlements in the community where the number of community members having the entitlement is less than the uncommon entitlement threshold are flagged as "uncommon" entitlements within the community. Any community members having a uncommon entitlement are also flagged so that these members may be analyzed more closely to determine whether or not they should have access to the uncommon entitlement. Information regarding which entitlements are uncommon in the community and which community members possess uncommon entitlements is stored in a uncommon entitlement information datastore 122 on the computing device 105 or some other computing device.

For example, referring again to the exemplary organization 250 illustrated in FIG. 5, each letter next to an entitlement-eligible entity represents an entitlement assigned to that particular entitlement-eligible entity. For example, entitlement-eligible entity 266 is assigned the four entitlements "A", "B", "C", and "D". It should be appreciated that FIG. 5 is an example of an organization that may be considerably simple compared to organizations that may typically use this system. Specifically, some organizations that use this system may have tens or hundreds of thousands of entitlement-eligible entities and potentially millions of different entitlements.

Supposing that the user of the entitlement managing system 110 selected community 254 in FIG. 5 to analyze and set the uncommon entitlement threshold to two. In such an example, entitlements "E", "F", and "Z" would be determined to be uncommon in this community 254. Members 268 and 271 would also be identified for having uncommon entitlements associated with them. In this way, a person in the organization would not have to analyze the entitlements of each member of the community in order to validate the entitlements assigned to the members of the community. Instead, the person could focus his or her efforts on only analyzing members 268 and 271 to determine if they should be associated with entitlements E, F, and/or Z.

Returning to FIG. 3, as illustrated by block 400, the processing system 120 also determines, based on a review of the current entitlement distribution within the selected community, which entitlements are "normal" within the community, where "normal" entitlements are generally thought of as those entitlements that are so common within the community that they may be considered cornerstone entitlements that may be desirable for everyone in the community to have. FIG. 7 provides a flow diagram illustrating a procedure for determining "normal" entitlements within a community in accordance with an embodiment of the invention. Although FIG. 3 illustrates that the uncommon entitlements are determined before the normal entitlements are determined, in other embodiments the steps may be reversed or conducted simultaneously.

As illustrated by block 405 in FIG. 7, the processing system 120 receives or accesses information regarding the current entitlement distribution within the selected community. For example, in one embodiment the current entitlement information 112 is stored in the memory of the computing device 105. In other embodiments, however, the processing system may access this information over the network 102 from one or more other computing systems, such as one or more data-providing terminals 130. The current entitlement information 112 generally contains a listing of the entitlements assigned to each entitlement-eligible entity within the selected community.

As illustrated by block 410 in FIG. 7, the processing system 120 also receives input regarding a normal entitlement threshold. The normal entitlement threshold may be provided by a user and stored in the normalcy factor datastore 114 in the memory of the computing device 105. In one embodiment, the normal entitlement threshold is community-specific. In other embodiments, however, the same normal entitlement threshold is used when analyzing all of the different communities in an organization. In one embodiment, the normal entitlement threshold entered by the user is an integer representing the minimum number of entitlement-eligible entities within the selected community that must have a particular entitlement in order for the particular entitlement to be considered normal. In other embodiments, the normal entitlement threshold entered by the user is a percentage representing the minimum percentage of entitlement-eligible entities within the selected community that must have a particular entitlement in order for the particular entitlement to be considered normal.

In still other embodiments, the normal entitlement threshold is automatically computed by the processing system 120 based on a statistical analysis of the distribution of entitlements within the community and/or other communities. For example, the normal entitlement threshold may be computed as being the number of entitlement-eligible entities having an entitlement in common that is some "x" number of standard deviations above or below the mean number of entitlement-eligible entities having an entitlement in common for the community or the organization. In another embodiment, an entitlement may be considered "normal" if it is shared by a majority of the community members.

In some embodiments, the normal entitlement threshold and the uncommon entitlement threshold are the same; however, in most embodiments the normal and uncommon thresholds will be different with some entitlements falling in a third category of entitlements that are not uncommon enough to be considered uncommon, but are also not common enough to be the "normal" cornerstone type entitlements in the community either.

As illustrated by block 420 in FIG. 7, the processing system 120 analyzes each entitlement within the community to determine whether the number of community members having the entitlement is greater than or equal to the normal entitlement threshold. As illustrated by block 430, any entitlements in the community where the number of community members having the entitlement is greater than or equal to the normal entitlement threshold are flagged as "normal" entitlements within the community. In one embodiment, any community members not having a certain normal entitlement are also flagged so that these members may be analyzed more closely to determine whether or not they should have access to the normal entitlement. Information regarding which entitlements are normal in the community and which community members do not possess normal entitlements is stored in a normal entitlement information datastore 124 on the computing device 105 or some other computing device.

For example, referring again to the exemplary organization 250 illustrated in FIG. 5, suppose that the normal entitlement threshold for all three communities shown 250, 252, and 254 is set at 50% of the members in the community. In such an example, entitlements "A", "B", and "C" would be determined to be normal in the organization 250 as a whole. Entitlements "A" and "E" would be determined to be normal in community 252. Entitlements "A", "B", "C", and "D" would be normal in community 254. As described above, members in a community that do not have all of the entitlements considered to be normal in the community may also be identified. For example, in FIG. 5, members 273 and 274 would be identified in community 252 for not having at least one of the normal entitlements "A" and "E". In this way, a person in the organization in charge of managing entitlements can focus his or her resources on members 273 and 274 to try and determine whether they should have entitlements "A" and "E" like the rest of community 252.

Returning again to FIG. 3, after the normal and uncommon entitlements are determined for the selected community, the entitlement managing system 110 determines the extent to which the community is "infected" based on the number of uncommon entitlements discovered within the community or the number of community members having a uncommon entitlement, as illustrated by block 500 in FIG. 3. Specifically, as described above, the entitlement managing system 110 determines the uncommon entitlements and the community members having uncommon entitlements in step 300 of the procedure illustrated in FIG. 3. The entitlement managing system 110 then determines a community infection indicator that is, for example, the number or percentage of uncommon entitlements existing within the community or the number or percentage of entitlement-eligible entities in the community having uncommon entitlements. This indicator and/or other information regarding the extent that the community is infected with uncommon entitlements are stored in a community infection information datastore 126 on the computing device 105. This information can then be used to indicate to the entitlement administrators in the organization which communities should be targeted first for more detailed entitlement review and validation procedures. A very high infection rate, however, could also indicate other information such as a poorly defined community.

As illustrated by block 200b of FIG. 3, after the selected community is analyzed, the entitlement managing system 110 may determine and select another community of entitlement-eligible entities in the organization to analyze. After the entitlement managing system 110 has finished analyzing some or all of the communities in the organization, the entitlement administrator(s) can begin investigating whether uncommon entitlements should be taken away from the respective entitlement-eligible entities that posses them, as illustrated by block 600 of FIG. 3. As described above, the administrator(s) may choose to address the communities based on the determined infection rate, going from the most severely infected communities to the least. In this regard, the entitlement managing system 110 may publish a list or map of infected communities ranked and/or color-coded based on infection rate.

In some embodiments, the entitlement managing system 110 automatically notifies certain persons in the organization regarding the discovery of uncommon entitlements. In other embodiments, however, the entitlement managing system 110 also handles the withholding or taking away of entitlements automatically. For example, in one embodiment the entitlement managing system 110 automatically withholds, withdraws, or suspends entitlements determined to be uncommon. However, in some embodiments, where communities within the organization overlap, an entitlement-eligible entity that is a member of two or more communities may have an entitlement that was determined to be uncommon in one community but normal, or at least acceptable, in the other community. In such a situation, the entitlement managing system 110 may be configured to recognize that the entitlement-eligible entity should have the uncommon entitlement based on his membership in the second community. As such, the entitlement managing system 110 will not flag the entitlement as uncommon, provided that, as described below, the possession of the uncommon entitlement does not create compliance issues regarding any known rules or regulations.

For example, referring again to FIG. 5, in one embodiment, the entitlement managing system 110 might initially identify entitlements "E" and "F" associated with member 271 as uncommon in community 254. The entitlement managing system 110, however, may then recognize that member 271 is also a member of community 252 where entitlement "E" is considered normal in that community. In such an embodiment, the entitlement managing system 110 may be configured to not identify member 271 as having a uncommon entitlement "E" if having such an entitlement does not violate some other predetermined rule. Entitlement "F" associated with member 271, however, would still be considered uncommon and, in one embodiment of the entitlement managing system 110, is automatically removed from member 271 by the system 110.

As illustrated by block 700 of FIG. 3, the entitlement administrator(s) may also use the information stored in the normal entitlement information datastore 124 to determine whether entitlements determined to be normal to a community should be distributed to other entitlement-eligible entities within the community. In one embodiment, the entitlement managing system 110 distributes or authorizes the distribution of normal entitlements automatically to those entitlement-eligible entities that do not have the entitlements determined to be normal within their communities. For example, referring to FIG. 5, in one embodiment of the entitlement managing system 110, the system 110 automatically assigns entitlement "C" to member 271 since entitlement "C" is normal in community 254.

FIG. 8 is a flow diagram illustrating a procedure for automatically determining whether any entitlements or combinations of entitlements in an organization create any compliance issues for the organization, in accordance with an embodiment of the invention. As described above, in some instances there are internal and/or external rules and regulations that may affect the distribution of entitlements within an organization. For example, an external law may exist that says the same person should not have access to both datasets A and B at the same time. Such a law could be stored in a rules and regulations datastore 118 on the computing device 105 and then used by the entitlement managing system 110 to automatically determine compliance issues within the organization. In another example, a background check of an employee could indicate a security risk and an internal rule within the organization may limit access to certain datasets to a certain level of security risk. If this rule is provided to the entitlement managing system 110, the system could automatically monitor such compliance issues, as illustrated by blocks 800 and 810 of FIG. 8. If the system 110 identifies a compliance issue, it stores information regarding the compliance issue into datastore 128 and may be configured to automatically notify an appropriate person in the organization, as illustrated by block 820 of FIG. 8. The system 110 may further be configured to automatically correct the compliance issue where possible, as illustrated by block 830 of FIG. 8.

FIG. 9 illustrates an exemplary graphical user interface for allowing a user to input information into the entitlement managing system 110 in order to more efficiently analyze the entitlements within an organization, in accordance with an embodiment of the invention. In the illustrated embodiment the "Hier Level" stands for the "hierarchy level" and, in this example, is the parameter that defines the community being examined. In the illustrated example, the Hier Level is set at "4" meaning it will take an organizational hierarchy code and define communities based on 4-dot associations. For example, for an organization with a hierarchy code of "FNVAC . . . ," "A" will be defined as Community FNVA.

The "Community Membership Requirement" parameter in the user interface is, in this example, equivalent to the uncommon entitlement threshold described above. In some embodiments, this parameter can either be an integer or a percentage value. In this example, with a value of "2," this parameter translates to mean that if less than two members of the community share a common entitlement the entitlement will be determined to be uncommon for the community.

The "Friend" parameter in FIG. 9 is, in this example, equivalent to the normal entitlement threshold described above and is meant to define a cornerstone entitlement. In the illustrated example the value is "5" meaning that, if five or more members share a common entitlement, the entitlement is a considered to be a population norm and is a cornerstone for the community. The input files shown in FIG. 8 are the files that have entitlement-eligible entity information, entitlement information, and community information (i.e., hierarchy information) stored therein.

FIGS. 10a and 10b illustrate graphical user interfaces providing exemplary output showing the results of the entitlement analysis performed in accordance with an embodiment of the present invention. As illustrated in FIGS. 10a and 10b, after the entitlement managing system 110 runs its analysis the output will display information regarding the community or communities at a macro level. This is the macro information about the communities given the bias from the input step. FIG. 10a illustrates the results generated from an analysis of a community at the 3-dot level with 1,230 unique entitlements ("platforms") in the community and 111 unique entitlement-eligible entities ("users"). FIG. 10a also states that, if a full analysis was to be done at the population level, 4,532 entitlement combinations would have to be analyzed. However, by using the entitlement managing system 110 and the community bias shown in FIG. 9, only twenty users show uncommon entitlement associations. Therefore, the entitlement administrators in the organization can focus on these twenty users instead of the 111 users in the community. This translates to an 81.98% efficiency gain over analyzing the entire community population, which is what traditionally has been done.

FIG. 10b illustrates an example where the Hier Level is increased to "4." As such, six communities are defined and the efficiency gain drops to 73.87%. This figure also illustrates how infection rates can be used to judge the portfolio of communities. The infection rates in FIG. 10b highlight that communities FNVA and FVNE have the highest infection rates and should be analyzed with the highest priority.

FIG. 10c illustrates a second component of the user output of the analysis which illustrates information at the micro level, in accordance with an embodiment of the invention. FIG. 10c illustrates the uncommon entitlements identified for a particular individual in the community. With this information, an entitlement administrator can contact the individual to determine if she needs any of the entitlements and, if so, why she needs it when few others in her community do. In most cases, these uncommon entitlements will be legacy entitlements or otherwise old, forgotten, or misplaced entitlements that the individual should not need.

Embodiments of the present invention can be implemented as a computer-aided method, as a system, as computer instruction codes, as an apparatus and/or combinations of any of the above. Some of the claims of the application have been drafted in means-plus-function format. While the means recited in these claims can be implemented by any number of systems, devices, computer program code, etc., provided below are examples of structural systems that may meet the functions outlined by the recited means.

For example, the processing means for selecting a group of members in the organization that have similar job functions and for determining whether any members of the group have access to information or resources that some predetermined amount of the members in the group do not have access to, etc., can be implemented as a processor or general computing element that uses software code instructions to perform these functions. The processor could, as an alternative, be an application specific IC chip that it hard-wired to perform the stated functions. The various means could also be met by a distributed network of processing elements that perform various portions of the recited functions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer program product for monitoring or controlling access to or distribution of a plurality of entitlements, the computer program product comprising a non-transitory computer readable medium having computer readable program instructions stored therein, wherein said computer readable program instructions comprise:

instructions configured to select a community of entitlement-eligible entities from a plurality of predefined communities of entitlement-eligible entities in an organization, wherein each of a plurality of entitlement-eligible entities in the selected community has one or more entitlements assigned thereto;

instructions configured to determine, for each of the one or more entitlements, the total number of the plurality of entitlement-eligible entities in the selected community that are assigned each entitlement;

instructions configured to receive an uncommon entitlement threshold for the selected community, wherein the received uncommon entitlement threshold is a predetermined value specific to the selected community of entitlement-eligible entities;

instructions configured to compare the total number for each of the one or more entitlements assigned to the plurality of entitlement eligible-entities in the selected community to the uncommon entitlement threshold;

instructions configured to determine which entitlements of the one or more entitlements that are uncommon, based at least partially on the comparison of the total number for each of the one or more entitlements to the uncommon entitlement threshold, and wherein an entitlement is uncommon if the total number for each of the one or more entitlements assigned to entitlement-eligible entities in the community is less than the uncommon entitlement threshold;

instructions configured to determine whether each of the uncommon entitlements requires validation or not prior to removing or withholding the uncommon entitlement from the entitlement-eligible entity in the selected community;

instructions configured to determine an infection rate that provides an indication of the extent that the selected community is infected with entitlements below the uncommon entitlement threshold, wherein the infection rate is the number or percentage of uncommon entitlements existing in a community;

instructions configured to compare the infection rate of the selected community with an infection rate of at least one other community; and instructions configured to direct resources to examining the entitlements of a community with a higher relative infection rate before directing resources to examining the entitlements of a community with a lower relative infection rate.

2. The computer program product of claim 1 further comprising:
instructions configured to determine, based on a review of the entitlements assigned to the entitlement-eligible entities in the community, the entitlements that are normal to the community, wherein an entitlement is determined to be normal if the number for each of the one or more entitlements assigned to entitlement-eligible entities in the community is greater than or equal to a normal entitlement threshold.

3. The computer program product of claim 2, further comprising instructions for receiving user input regarding the normal entitlement threshold.

4. The computer program product of claim 1, wherein entitlement-eligible entities within the same community have similar job functions.

5. The computer program product of claim 1, further comprising instructions for receiving user input regarding the uncommon entitlement threshold.

6. The computer program product of claim 1, wherein entitlements comprise access to particular software applications, access to particular datasets, write access to particular datasets, access to certain organizational resources, or access to particular locations within a physical or virtual environment.

7. The computer program product of claim 1, wherein the entitlement-eligible entities comprises persons in the organization.

8. The computer program product of claim 1, further comprising: instructions for automatically notifying a person within the organization of the discovery of uncommon entitlements.

9. The computer program product of claim 1, further comprising: instructions for automatically removing or withholding any entitlements in the community that are determined to be uncommon entitlements.

10. The computer program product of claim 1, further comprising:
instructions for comparing the distribution of entitlements within the community to a plurality of predefined rules to determine whether the distribution of entitlements within the community comply with the plurality of predefined rules.

11. A computer program product for monitoring or controlling access to or distribution of a plurality of entitlements, the computer program product comprising a non-transitory computer readable medium having computer readable program instructions stored therein, wherein said non-transitory computer readable program instructions comprise:
instructions configured to select a community of entitlement-eligible entities from a plurality of predefined communities of entitlement-eligible entities in an organization, wherein each of a plurality of entitlement-eligible entities in the selected community has one or more entitlements assigned thereto;
instructions configured to determine, for each of the one or more entitlements, the total number of the plurality of entitlement-eligible entities in the selected community that are assigned each entitlement;
instructions configured to receive a normal entitlement threshold for the selected community, wherein the received normal entitlement threshold is a predetermined value specific to the selected community of entitlement-eligible entities;
instructions configured to compare the total number for each of the one or more entitlements assigned to the plurality of entitlement-eligible entities in the selected community to the normal entitlement threshold;
instructions configured to receive an uncommon entitlement threshold for the selected community, wherein the received uncommon entitlement threshold is a predetermined value specific to the selected community of entitlement-eligible entities;
instructions configured to compare the total number for each of the one or more entitlements assigned to the plurality of entitlement eligible-entities in the selected community to the uncommon entitlement threshold;
instructions to determine which entitlements of the one or more entitlements that are normal, based at least partially on the comparison of the total number for each of the one or more entitlements to the normal entitlement threshold, and wherein the entitlement is normal if the total number for each of the one or more entitlements assigned to the plurality of entitlement-eligible entities is greater than or equal to the normal entitlement threshold;
instructions configured to determine whether each of the normal entitlements requires validation or not prior to providing the normal entitlement to the entitlement-eligible entities in the selected community that do not have the normal entitlement;
instructions configured to determine an infection rate that provides an indication of the extent that the selected community is infected with entitlements below the uncommon entitlement threshold, wherein the infection rate is the number or percentage of uncommon entitlements existing in a community;
instructions configured to compare the infection rate of the selected community with an infection rate of at least one other community; and
instructions configured to direct resources to examining the entitlements of a community with a higher relative infection rate before directing resources to examining the entitlements of a community with a lower relative infection rate.

12. The computer program product of claim 11, further comprising instructions for receiving user input regarding the normal entitlement threshold.

13. The computer program product of claim 11, further comprising instructions for receiving user input regarding the selection of a community.

14. The computer program product of claim 11, further comprising:
instructions for identifying the entitlement-eligible entities within the community that do not have entitlements determined by the instructions to be normal to the community.

15. The computer program product of claim 14, further comprising:
instructions for automatically distributing entitlements in the community to the entitlement-eligible entities within the community that do not have entitlements determined by the instructions to be normal to the community.

16. A system for managing entitlements, the system comprising:
a memory device having stored therein information regarding a plurality of entitlement-eligible entities in an organization and information regarding one or more entitlements currently assigned to each entitlement-eligible entity, wherein said memory device further comprises community information stored therein regarding a plurality of communities of the plurality of entitlement-eligible entities in the organization and regarding which entitlement-eligible entities are in which communities; and a processing device communicatively coupled to said memory device, wherein said processing device is configured to:

select a community of entitlement-eligible entities from the plurality of predefined communities of entitlement-eligible entities based at least partially on the community information stored in the memory device;

determine, for each of the one or more entitlements, the total number of the plurality of entitlement-eligible entities in the selected community that are assigned each entitlement;

receive an uncommon entitlement threshold for the selected community, wherein the received uncommon entitlement threshold is a predetermined value specific to the selected community of entitlement-eligible entities;

compare the total number for each of the one or more entitlements assigned to entitlement-eligible entities in the selected community to the uncommon entitlement threshold;

determine the uncommon entitlements of the one or more entitlements assigned to the entitlement-eligible entities in the community, based at least partially on the comparison of the total number for each of the one or more entitlements to the uncommon entitlement threshold, and wherein an entitlement is uncommon if the total number for each of the one or more entitlements assigned to entitlement-eligible entities is less than the uncommon entitlement threshold;

determine whether each of the uncommon entitlements requires validation or not prior to removing or withholding the uncommon entitlement from the entitlement-eligible entities in the selected community that have the uncommon entitlement;

determine an infection rate that provides an indication of the extent that the selected community is infected with entitlements below the uncommon entitlement threshold, wherein the infection rate is the number or percentage of uncommon entitlements existing in a community;

compare the infection rate of the selected community with an infection rate of at least one other community; and direct resources to examining the entitlements of a community with a higher relative infection rate before directing resources to examining the entitlements of a community with a lower relative infection rate.

17. The system of claim 16, further comprising:
a user input device communicatively coupled to the processing device and configured to receive user input regarding a user selection of a community of entitlement-eligible entities, wherein the processing system is further configured to select a community of entitlement-eligible entities based at least partially on the user input and at least partially on the community information stored in the memory device.

18. The system of claim 16, further comprising:
a user input device communicatively coupled to the processing device and configured to receive user input regarding the uncommon entitlement threshold or the normal entitlement threshold.

19. The system of claim 16, further comprising:
a user output device communicatively coupled to the processing device and configured to provide output to a user indicating the uncommon entitlements or the entitlement-eligible entities associated with the uncommon entitlements.

20. The system of claim 16, further comprising:
a user output device communicatively coupled to the processing device and configured to provide output to a user indicating the infection rate of the selected community relative to infection rates of one or more other communities.

21. The system of claim 16, further comprising:
a user output device communicatively coupled to the processing device and configured to provide output to a user indicating the normal entitlements or the entitlement-eligible entities not associated with the normal entitlements.

22. The system of claim 16, wherein the memory device comprises one or more predetermined rules, wherein the processing device is further configured to review the one or more entitlements currently associated with each entitlement-eligible entity within the selected community to determine if any of entitlement associations violate the one or more predetermined rules, and wherein the system further comprises:
a user output device communicatively coupled to the processing device and configured to provide output to a user indicating a compliance issue if any of the entitlement associations violate the one or more predetermined rules.

23. The system of claim 16, wherein the entitlements comprises access rights to an organization's information or resources.

24. A method for managing the distribution of entitlements within an organization, said method comprising:
providing information regarding a plurality of members in the organization and the entitlements that are currently assigned to each member;

grouping members from the plurality of members into one or more communities based on one or more similar job functions;

selecting a community from the one or more communities;

analyzing the entitlements that are currently assigned to the members of the selected community;

determining, for each entitlement in the selected community, the number of members in the selected community that are currently assigned each entitlement;

receiving an uncommon entitlement threshold for the selected community, wherein the received uncommon entitlement threshold is a predetermined value specific to the selected community of members;

determining, using a processor, whether the number of members in the selected community that are currently assigned each entitlement is below the uncommon entitlement threshold, based at least partially on a comparison of the number of members in the selected community assigned each entitlement to the uncommon entitlement threshold;

identifying the members in the selected community assigned entitlements below the uncommon entitlement threshold;

determining whether each of the entitlements below the uncommon entitlement threshold assigned to the identified members requires validation or not prior to removing or withholding the entitlements in the selected community below the uncommon entitlement threshold;

determining an infection rate that provides an indication of the extent that the selected community is infected with entitlements below the uncommon entitlement threshold, wherein the infection rate is the number or percentage of uncommon entitlements existing in a community;

comparing the infection rate of the selected community with an infection rate of at least one other community; and directing further resources to examining the entitlements of a community with a higher relative infection rate before directing further resources to examining the entitlements of a community with a lower relative infection rate.

25. The method of claim 24, further comprising:

determining whether the number of members in the selected community that are currently associated with each entitlement is above the certain threshold;

identifying the members in the selected community not associated with entitlements above the certain threshold; and determining whether the identified members should be associated with the entitlements above the threshold.

26. The method of claim 24, further comprising:

automatically withdrawing entitlements in the community that are below the threshold from the members in the selected community that are associated with the entitlements below the threshold.

27. A method for managing the distribution of entitlements within an organization, said method comprising:

providing information regarding a plurality of members in the organization and the entitlements that are currently assigned to each member;

grouping members from the plurality of members into one or more communities based on one or more similar job functions;

selecting a community from the one or more communities;

analyzing the entitlements that are currently assigned to the members of the selected community;

determining, for each entitlement in the selected community, a number of members in the selected community that are currently assigned each entitlement;

receiving a normal entitlement threshold for the selected community, wherein the received normal entitlement threshold is a predetermined value specific to the selected community of members;

determining, using a processing device, whether the number of members in the selected community that are currently assigned each entitlement is above the normal entitlement threshold, based at least partially on a comparison of the number of members in the selected community assigned each entitlement to the normal entitlement threshold;

receiving an uncommon entitlement threshold for the selected community, wherein the received uncommon entitlement threshold is a predetermined value specific to the selected community of members;

determining, using a processor, whether the number of members in the selected community that are currently assigned each entitlement is below the uncommon entitlement threshold, based at least partially on a comparison of the number of members in the selected community assigned each entitlement to the uncommon entitlement threshold;

identifying the members in the selected community not associated with assigned entitlements above the normal entitlement threshold;

identifying the entitlements in the selected community that are above the normal entitlement threshold;

determining whether each of the entitlements above the normal entitlement threshold requires validation or not prior to providing the normal entitlement to the members of the selected community identified as not being assigned entitlements above the normal entitlement threshold;

determining an infection rate that provides an indication of the extent that the selected community is infected with entitlements below the uncommon entitlement threshold, wherein the infection rate is the number or percentage of uncommon entitlements existing in a community;

comparing the infection rate of the selected community with an infection rate of at least one other community; and directing further resources to examining the entitlements of a community with a higher relative infection rate before directing further resources to examining the entitlements of a community with a lower relative infection rate.

28. The method of claim 27, further comprising:

automatically distributing entitlements in the community that are above the threshold to the members in the selected community that are not associated with the entitlements above the threshold.

\* \* \* \* \*